(12) United States Patent
Byrne et al.

(10) Patent No.: US 10,381,808 B2
(45) Date of Patent: Aug. 13, 2019

(54) CORD SYSTEM FOR HEIGHT-ADJUSTABLE FURNITURE

(71) Applicants: Norman R. Byrne, Ada, MI (US); Robert L. Knapp, Rockford, MI (US)

(72) Inventors: Norman R. Byrne, Ada, MI (US); Robert L. Knapp, Rockford, MI (US)

(*) Notice: Subject to any disclaimer, the term of this patent is extended or adjusted under 35 U.S.C. 154(b) by 0 days.

(21) Appl. No.: 15/713,812

(22) Filed: Sep. 25, 2017

(65) Prior Publication Data
US 2018/0090915 A1    Mar. 29, 2018

Related U.S. Application Data

(60) Provisional application No. 62/399,736, filed on Sep. 26, 2016.

(51) Int. Cl.
| | |
|---|---|
| H02B 1/06 | (2006.01) |
| A47B 21/06 | (2006.01) |
| A47B 9/20 | (2006.01) |
| A47B 21/02 | (2006.01) |

(52) U.S. Cl.
CPC .............. *H02B 1/06* (2013.01); *A47B 21/06* (2013.01); *A47B 9/20* (2013.01); *A47B 21/02* (2013.01); *A47B 2021/066* (2013.01); *A47B 2200/0082* (2013.01)

(58) Field of Classification Search
CPC ...... A47B 2200/008; A47B 2200/0081; A47B 2200/0082; A47B 2200/0083; A47B 2200/0084
USPC ...................................... 108/50.02
See application file for complete search history.

(56) References Cited

U.S. PATENT DOCUMENTS

| | | |
|---|---|---|
| 1,189,435 A | 7/1916 | Edmands |
| 3,128,344 A | 4/1964 | Goold |
| 3,770,334 A | 11/1973 | Weber |
| 4,748,913 A | 6/1988 | Favaretto et al. |

(Continued)

FOREIGN PATENT DOCUMENTS

| | | |
|---|---|---|
| DE | 202006004788 | 7/2006 |
| DE | 202007006673 | 10/2007 |

(Continued)

OTHER PUBLICATIONS

Nesta Flip Top Talbes, Nesta, downloaded from website www.smartdesks.com/flip-top-training-conference-table-nesta-laptop-tables.asp, Jun. 23, 2015, pp. 1-4.

(Continued)

*Primary Examiner* — Jose V Chen
(74) *Attorney, Agent, or Firm* — Gardner, Linn, Burkhart & Ondersma LLP

(57) ABSTRACT

An electrical power or data system for height-adjustable furniture includes a self-retracting cord section that extends and retracts in response to an upper furniture portion raising and lowering with respect to a lower furniture portion, such as to limit or avoid entanglement of the cord with other objects in the vicinity of the furniture. The system includes an electrical power or data cord having an input end portion and an output end portion, with the retracting cord section disposed between the input and output end portions, and with an electrical power or data connector at the output end portion and configured for mounting along the upper furniture portion.

12 Claims, 3 Drawing Sheets

(56) References Cited

U.S. PATENT DOCUMENTS

| | | | |
|---|---|---|---|
| 4,762,072 A * | 8/1988 | Boundy | A47B 21/06 108/50.02 |
| 4,852,500 A * | 8/1989 | Ryburg | A47B 21/03 108/105 |
| 4,953,469 A | 9/1990 | Kuchta et al. | |
| 5,224,429 A | 7/1993 | Borgman et al. | |
| 5,428,928 A | 7/1995 | Hellwig et al. | |
| 5,522,324 A | 6/1996 | van Gelder et al. | |
| 5,967,820 A | 10/1999 | Siegal et al. | |
| 5,988,076 A * | 11/1999 | Vander Park | A47B 21/06 108/50.02 |
| 6,003,447 A | 12/1999 | Cox et al. | |
| 6,183,280 B1 | 2/2001 | Laukhuf | |
| 6,202,567 B1 | 3/2001 | Funk et al. | |
| 6,216,834 B1 * | 4/2001 | Steinhovden | B65H 75/368 191/12 R |
| 6,327,983 B1 * | 12/2001 | Cronk | A47B 21/06 108/50.02 |
| 6,336,414 B1 | 1/2002 | Stewart et al. | |
| 6,352,037 B1 * | 3/2002 | Doyle | A47B 9/00 108/147 |
| 6,360,675 B1 * | 3/2002 | Jones | A47B 9/00 108/50.02 |
| 6,415,723 B1 | 7/2002 | Kopish et al. | |
| 6,581,890 B2 | 6/2003 | Johnson et al. | |
| 6,848,369 B1 * | 2/2005 | King | A47B 21/06 108/50.01 |
| 7,006,097 B2 | 6/2006 | Gayhart et al. | |
| 7,191,713 B2 | 3/2007 | Gayhart et al. | |
| 7,312,393 B2 | 12/2007 | McCarthy | |
| 7,357,086 B2 | 4/2008 | Petrick et al. | |
| 7,549,381 B1 | 6/2009 | Nail, Jr. et al. | |
| 7,640,866 B1 * | 1/2010 | Schermerhorn | A47B 21/00 108/5 |
| 7,871,280 B2 | 1/2011 | Henriott | |
| 7,893,567 B1 | 2/2011 | Deros et al. | |
| 7,901,224 B1 | 3/2011 | Black et al. | |
| 7,966,951 B1 | 6/2011 | Black et al. | |
| 7,975,624 B2 | 7/2011 | Henriott | |
| 8,146,229 B2 | 4/2012 | Henriott et al. | |
| 8,174,379 B2 * | 5/2012 | Black | H01R 27/02 108/50.02 |
| 8,317,537 B1 | 11/2012 | Black et al. | |
| 8,482,160 B2 | 7/2013 | Johnson et al. | |
| 8,512,072 B1 | 8/2013 | Black et al. | |
| 8,552,853 B2 | 10/2013 | Black | |
| 8,723,055 B2 | 5/2014 | Beldock et al. | |
| 8,790,131 B1 | 7/2014 | Black et al. | |
| 8,935,985 B2 | 1/2015 | Hjelm | |
| 8,937,407 B2 | 1/2015 | Byrne et al. | |
| 8,947,215 B2 | 2/2015 | Mandel et al. | |
| 9,078,348 B1 | 7/2015 | Grandin et al. | |
| 9,084,475 B2 | 7/2015 | Hjelm | |
| 9,088,117 B2 | 7/2015 | Rosenblum | |
| 9,098,823 B2 | 8/2015 | Slesinger et al. | |
| 9,112,298 B1 | 8/2015 | Hayden et al. | |
| 9,124,044 B2 | 9/2015 | Beldock et al. | |
| 9,146,029 B2 | 9/2015 | Nicieja et al. | |
| 9,176,531 B1 | 11/2015 | Hayden et al. | |
| 9,331,443 B1 | 5/2016 | Hayden et al. | |
| 9,484,751 B2 | 11/2016 | Byrne et al. | |
| 9,516,772 B2 * | 12/2016 | Mangione | H05K 5/0217 |
| 9,635,932 B2 * | 5/2017 | Kelley | A47B 21/06 |
| 2003/0020381 A1 * | 1/2003 | Cattaneo | A47B 21/06 312/223.6 |
| 2004/0026998 A1 | 2/2004 | Henriott et al. | |
| 2005/0268823 A1 | 12/2005 | Bakker et al. | |
| 2006/0081157 A1 | 4/2006 | Gayhart et al. | |
| 2007/0227409 A1 * | 10/2007 | Chu | A47B 21/00 108/50.02 |
| 2009/0012634 A1 | 1/2009 | Koch | |
| 2009/0078171 A1 * | 3/2009 | Frost | A47B 9/00 108/50.02 |
| 2009/0260547 A1 * | 10/2009 | Epstein | A47B 37/00 108/50.02 |
| 2009/0284655 A1 * | 11/2009 | Lukes | A47B 21/007 348/552 |
| 2009/0293773 A1 * | 12/2009 | Miller | A47B 21/00 108/28 |
| 2011/0197794 A1 * | 8/2011 | Nunes | B65H 75/36 108/50.02 |
| 2012/0181979 A1 | 7/2012 | Hudspeth et al. | |
| 2012/0312196 A1 * | 12/2012 | Newkirk | H02J 7/025 108/23 |
| 2013/0015300 A1 | 1/2013 | Klinke | |
| 2013/0204438 A1 * | 8/2013 | Hjelm | A47B 9/00 700/275 |
| 2014/0368476 A1 | 12/2014 | Rauch et al. | |
| 2015/0351530 A1 | 12/2015 | Udagawa et al. | |

FOREIGN PATENT DOCUMENTS

| | | |
|---|---|---|
| DE | 102008044848 | 3/2010 |
| DE | 102009043126 | 3/2011 |
| DE | 102009053754 | 5/2011 |
| EP | 2154761 | 2/2010 |
| EP | 2712516 | 9/2013 |
| JP | H07178230 | 7/1995 |
| JP | 2002063969 | 2/2002 |
| WO | WO9719617 | 6/1997 |
| WO | 2016023700 | 2/2016 |
| WO | 2016121732 | 8/2016 |

OTHER PUBLICATIONS

Villa Series DaisyLink, ECA Electri-Cable Assemblies Innovative Power & Data Solutions, downloaded from website www.electri-clable.com/ProductDetails.asp?ProductCode=%2DDAISYLINK%2DVILLA, Jun. 23, 2015, pp. 1-2.

Standing Desk Shootout: Hawthorn Planes Height-Adjustable Table, Core77, downloaded from website www.core77.com/posts/20224/Standing-Desk-Shootout-Hawthorn-Planes-Height-Adjustable-Table, Apr. 6, 2016, pp. 1-25.

* cited by examiner

CORD SYSTEM FOR HEIGHT-ADJUSTABLE FURNITURE

CROSS REFERENCE TO RELATED APPLICATION

The present application claims the filing benefits of U.S. provisional application Ser. No. 62/399,736, filed Sep. 26, 2016, which is hereby incorporated by reference herein in its entirety.

FIELD OF THE INVENTION

The present invention relates to electrical power and data systems that are mountable along height-adjustable furniture, such as in a work area

BACKGROUND OF THE INVENTION

Electrical power and data units or outlets are commonly installed along furniture articles such as tables, desks, and chairs, particularly in work areas. In some cases it is desirable to install electrical power and data units or outlets to a work surface that raises and lowers, such as along a height-adjustable table or desk. The cords and cables that connect the power and data units or outlets to fixed power or data outlets are carried up and down as the height changes. This movement creates a risk that moving cables will catch on other furniture or objects, potentially causing damage to the cables and their connections, or to the other furniture or objects. In some cases a poorly routed cable or cord can overturn a floor-mounted desktop computer, disconnect plugs of other electrical devices from their sockets, and cause other problems when a user raises a height-adjustable work surface.

SUMMARY OF THE INVENTION

The present invention provides an electrical power or data cord system, typically associated with electrical power and/or electronic data, for height-adjustable furniture, in which exposed cords or lines of the system remain substantially motionless during adjustment of the furniture height, so as to limit or prevent undesired interactions between the exposed cords or lines and other objects in their vicinity. The system can also improve the aesthetics of a workstation in which one or more devices requiring power, data, or fluid connections, can be connected to receptacles or outlets that move with the moving parts of the furniture (e.g., workstation) rather than to separate receptacles or outlets located in stationary surfaces (e.g., wall or floor mounted outlets) located nearby.

In one form of the present invention, an electrical power or data system includes a self-retracting cord section that extends and retracts a portion of a cord in response to an upper furniture portion raising and lowering with respect to a lower furniture portion. The system includes an electrical power or data cord having an input end portion and an output end portion, with the retracting cord section disposed between the input and output end portions, and with an electrical power or data outlet at the output end portion and configured for mounting along the upper furniture portion. The input end portion of the cord remains substantially motionless during raising and lowering of the movable portion of the furniture article, which can limit or avoid inadvertent engagement or entanglement of the cord with other objects in the vicinity of the furniture.

According to one aspect, the self-retracting cord section includes an elastic coil portion of the cord.

According to another aspect, the electrical power or data connector includes a high voltage AC power outlet or a low voltage DC power outlet.

According to a further aspect, the input end portion of the electrical power or data cord includes a high voltage AC power plug and/or a low voltage DC power plug and/or an electronic data signal plug.

According to yet another aspect, the electrical power or data system is taken in combination with the height-adjustable furniture. Optionally, the movable portion of the height-adjustable furniture includes a tabletop or desktop. The stationary portion of the height-adjustable furniture may include respective lower leg portions of a plurality of upright legs that are coupled to the table top or desktop. Optionally, the upright legs include respective upper leg portions that are telescopingly engaged with respective ones of the lower leg portions.

According to a still further aspect, a cord storage and support member is coupled to the tabletop or desktop and defines a hollow channel for receiving and concealing the self-retracting cord section.

According to still another aspect, at least one of the upright legs defines a hollow interior region, and the height-adjustable furniture further includes an elbow conduit in communication with both the hollow interior region and the hollow channel of the cord storage and support member. Optionally, an intermediate portion of the electrical power or data cord between the self-retracting cord section and the input end portion is routed through the elbow conduit, and the intermediate portion of the electrical power or data cord is movable through the elbow conduit as the height-adjustable furniture is raised and lowered.

According to another aspect, at least one of the upright legs defines a hollow interior region, and a portion of the electrical power or data cord located between the input end portion and the self-retracting cord section is disposed in the hollow interior region. Optionally, the lower leg portion of the at least one upright leg defines an opening through which the electrical power or data cord passes into the hollow interior region.

Thus, the electrical power or data system and height-adjustable furniture of the present invention substantially limits or precludes movement of exposed cord regions when the height-adjustable furniture is raised or lowered. The system and furniture may conceal a majority of the wiring or cords by routing them through hollow legs and/or support channels associated with the furniture, and may take up cord slack in concealed areas so that exposed wiring or cord sections remain substantially stationary during raising and lowering of the furniture.

These and other objects, advantages, purposes and features of the present invention will become apparent upon review of the following specification in conjunction with the drawings.

DESCRIPTION OF THE PREFERRED EMBODIMENTS

Figure 1:
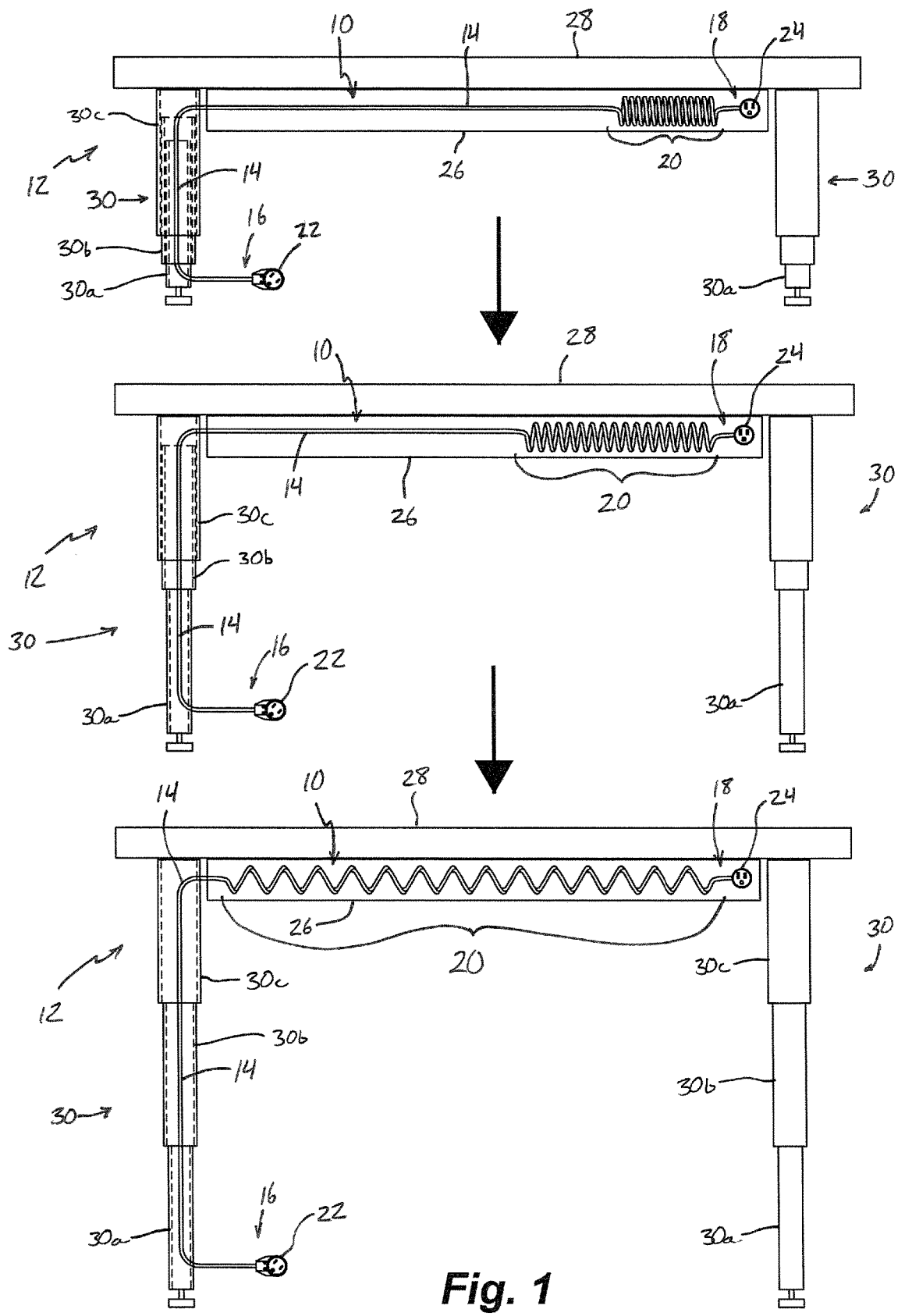
FIG. 1 is a series of three front elevations of a height-adjustable table fitted with an electrical power system in accordance with the present invention, depicting three different table heights and with portions made transparent to show internal structure.

Referring now to the drawings and the illustrative embodiments depicted therein, a cord system 10 is specially adapted for installation along a height-adjustable furniture article 12, such as a table, desk, or chair. In the illustrated embodiment, cord system 10 is an electrical power or data system 10 that is installed along furniture article 12, and which allows the furniture article 12 to be raised and lowered such as in the manner illustrated in FIG. 1, without pulling or otherwise moving exposed portions of electrical power or data system 10 in a manner that could catch on other objects in the vicinity of the furniture article. Electrical power or data system 10 accomplishes this by substantially limiting cord movements to covered or shrouded areas of furniture article 12, as will be described below in more detail.

Electrical power or data system 10 includes an electrical power or data cord 14 having an input end portion 16 and an output end portion 18 opposite the input end portion 16, with a self-retracting cord section 20 disposed between the input end portion 16 and the output end portion 18 (FIG. 1). In the illustrated embodiment, input end portion 16 is fitted with an electrical input receptacle 22 in the form of a female high voltage AC receptacle, although it will be appreciated that a male high voltage AC plug would be more typical in this application, and that substantially any desired type of high or low voltage power and/or data connector may be fitted at input end portion 16. In addition, input end portion 16 could terminate with exposed wires that are ready for hard-wiring to an electrical power source. Similarly, output end portion 18 is fitted with its own electrical receptacle 24, which is illustrated as a female high voltage AC receptacle, although substantially any type of high or low voltage power and/or data connector may be fitted at output end portion 18 provided that the electrical receptacles 22, 24 are compatible with one another and with the conductors or conduits (including light conduits such as fiber optics) of electrical power or data cord 14.

Output electrical receptacle 24 is mounted to a cord storage and support member 26 that is attached to an underside of a movable tabletop 28 of height-adjustable furniture article 12, so that receptacle 24 is accessible to users of the furniture article 12 when the tabletop 28 is raised (FIG. 1 at bottom), lowered (FIG. 1 at top), or at an intermediate height (FIG. 1 at middle). Support member 26 may be a generally L-shaped tray, a C-shaped tray, a rectangular or square section (or other shape) hollow tube, or substantially any other shape of elongate support that is capable of concealing and/or supporting electrical power or data cord including self-retracting cord section 20. Input end portion 16 and input receptacle 22 may be flexible and generally loose as shown, and may extend outwardly from a lower stationary portion 30a of one of a plurality of upright legs 30 for connection to an electrical power and/or data source such as floor-mounted or wall-mounted outlet or connector (not shown).

Self-retracting cord section 20 is supported in cord storage and support member 26, and is extendable and retractable therein as movable tabletop 28 is raised and lowered, such as shown in FIG. 1. In the illustrated embodiment, self-retracting cord section 20 is a coiled portion of electrical power or data cord 14 that contains a resilient material that causes cord section 20 to recoil to a retracted and shortened-length configuration (FIG. 1 at top), but which permits cord section 20 to extend and assume a lengthened configuration (FIG. 1 at middle and bottom) when sufficient tensile force is applied to electrical power or data cord 14 at opposite sides of cord section 20. Greater tensile force results in longer extension of self-retracting cord section 20. The tensile force is imparted to electrical power or data cord 14 by raising tabletop 28, which is accomplished by extending and retracting legs 30. Extending legs 30 imparts tension to electrical power or data cord 14 because electrical output receptacle 24 and output end portion 18 of cord 14 are held fixed relative to cord storage and support member 26 and tabletop 28, while output end portion 16 of cord 14 is held fixed where it exits lower leg portion 30a, as will be described in more detail below.

Retracting legs 30 reduces the tension in electrical power or data cord 14, including across self-retracting cord section 20, because less of cord 14 is drawn into the leg 30 through which the cord passes. Thus, when furniture article 12 is fully raised with legs 30 fully extended (FIG. 1 at bottom), a relatively longer portion of cord 14 is drawn into the leg 30 causing self-retracting cord section 20 to extend a relatively long distance (e.g., substantially the full length of cord storage and support member 26, as shown), whereas the self-retracting cord section 20 assumes a much shorter length, due to its resilience, when the legs 30 are fully retracted and the least amount of cord 14 is positioned in the leg 30 (FIG. 1 at top).

Although self-retracting cord section 20 is illustrated as being an elastic coil region of cord 14, which is well known in the art such as for telephone cords, electrical and air lines for tractor-trailer connections, and the like, it is envisioned that other types of self-retracting technologies would also be suitable. For example, a spring-actuated cord retractor or electrically-actuated (motorized) retractor may be mounted at cord storage and support member 26 or to an underside of movable tabletop 28. Such a retractor would be capable of paying out cord 14 as legs 30 are extended and automatically winding the cord 14 in as legs 30 are retracted, while maintaining electrical continuity between the input end portion 16 and output end portion 18 of the electrical power or data system 10, without departing from the spirit and scope of the present invention.

In the illustrated embodiment, upright legs 30 are generally tubular and are axially extendable and retractable in a telescoping manner, with lower stationary leg portions 30a supported on a floor or other support surface, intermediate leg portions 30b having a sufficiently large inner diameter to receive lower stationary leg portions 30a, and upper leg portions 30c having sufficiently large inner diameter to receive intermediate leg portions 30b. Upper leg portions 30c are secured at their upper ends to an underside of tabletop 28. A powered or manual lifting system (not shown) is operable to raise and lower upper leg portions 30c relative to lower stationary leg portions 30a to thereby raise and lower tabletop 28, with the leg portions 30a-c of each upright leg 30 moving axially relative to one another in a telescoping manner. Because each of the leg portions 30a-c is generally a hollow tubular shape, cord 14 may be held substantially fixed relative to stationary lower leg portion 30a and may pass into and out of the intermediate leg portion 30b and the upper leg portion 30c as the legs 30 are extended and retracted. The powered lifting system may be substantially conventional, and may include, for example, electrically driven leadscrews, compressed gas struts or actuatable piston-cylinder arrangements, or the like.

Figure 2:
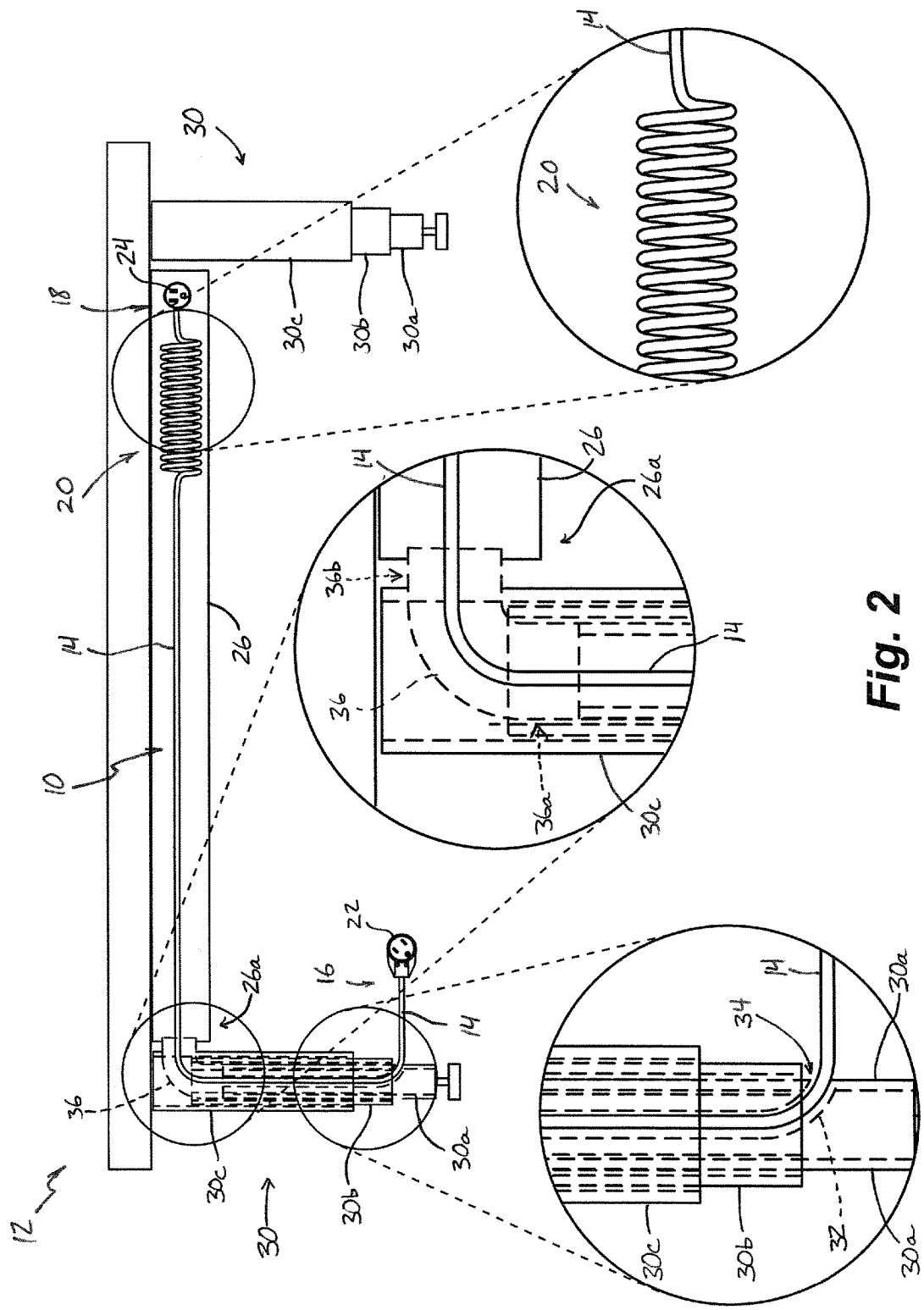
FIG. 2 is a front elevation of the height-adjustable table with electrical power system of FIG. 1, shown in the lowest table height, and with three designated areas shown enlarged.
Figure 3:
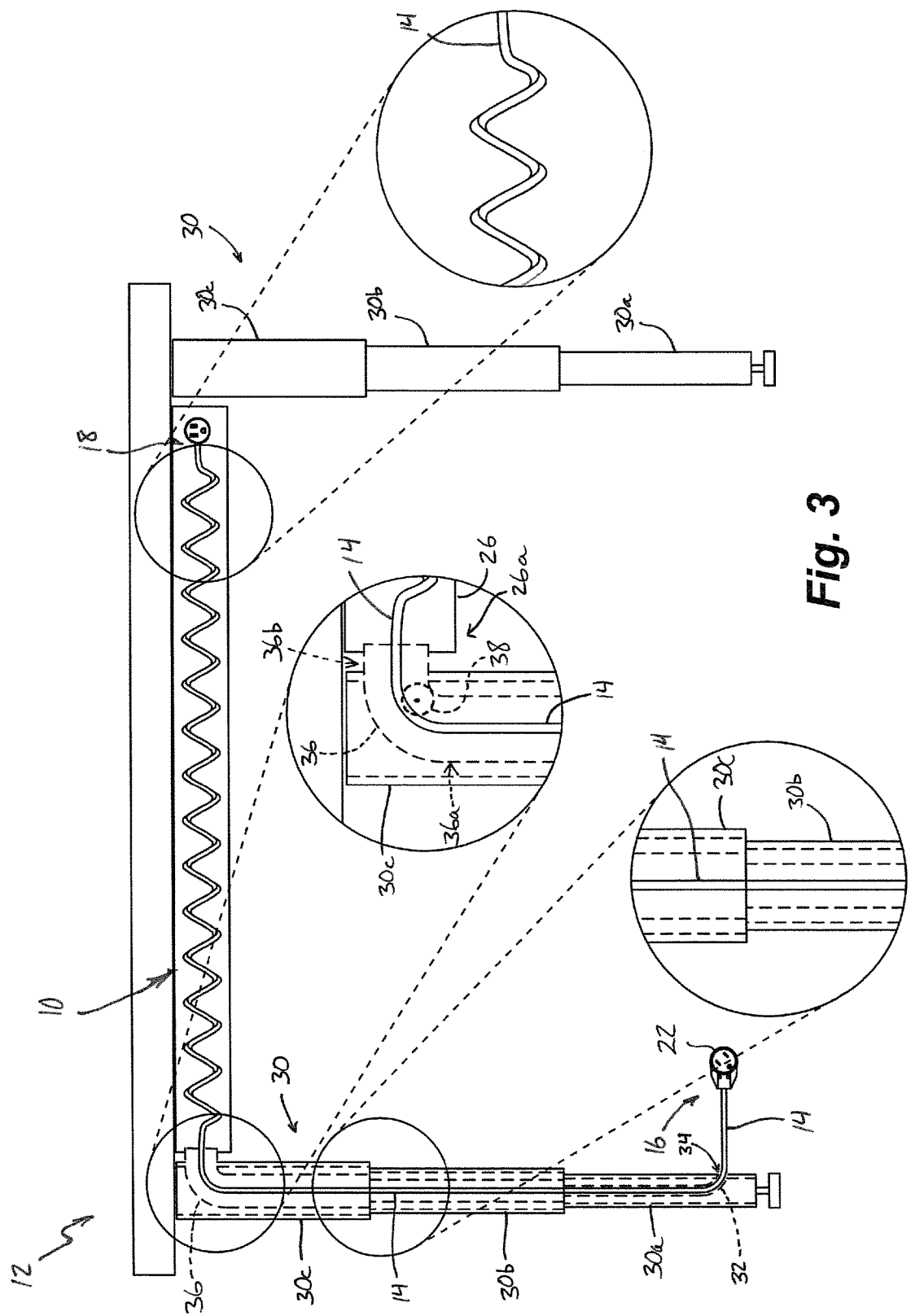
FIG. 3 is a front elevation of the height-adjustable table with electrical power system of FIG. 1, shown in the highest position, and with three designated areas shown enlarged.

Referring now to FIGS. 2 and 3, cord 14 passes through a tubular conduit 32 formed in lower stationary leg portion 30a. Cord 14 exits a lower end portion of lower stationary leg portion 30a at an opening 34 formed in a generally cylindrical sidewall of leg portion 30a, as best shown in the enlarged view at left in FIG. 2. Optionally, a rubber grommet or strain relief is provided at opening 34, surrounding cord 14, to secure the cord at lower leg portion 30a. This permits cord 14 (including input end portion 16) to remain substantially fixed in the lower leg portion's tubular conduit 32, even as the intermediate and upper leg portions 30b, 30c extend and retract relative to lower leg portion 30a.

A 90-degree elbow conduit 36 is provided at an upper end portion of the upper leg portion 30c through which cord 14 is routed, such as shown in FIGS. 2 and 3 (including center enlarged views). Elbow conduit 36 includes a substantially vertical lower portion 36a that is coaxial with leg portions 30a-c, and a substantially horizontal upper portion 36b that is in communication with an end portion 26a of cord storage and support member 26. The hollow tubular interiors of the leg portions 30a-c of the upright leg 30, through which cord 14 is routed, are open to vertical lower portion 36a of the 90-degree elbow conduit 36, such that cord 14 is free to slide or otherwise move through elbow conduit 36 as tabletop 28 is moved (together with upper leg portion 30c and elbow conduit 36) up and down relative to lower stationary leg portion 30a.

To limit or prevent wear of cord 14 as it slides through elbow conduit 36, an outer jacket of cord 14 may provide abrasion resistance, particularly in the region between self-retracting cord section 20 and input end portion 16, while interior surfaces of 90-degree elbow conduit 36 may be generally smooth so as to limit or prevent abrasion. In addition, a dry or liquid lubricant may be applied along surfaces where cord 14 slides. Optionally, a pulley or sheave 38 (FIG. 3, enlarged view only) having a grooved outer contact surface, may be positioned along the 90-degree bend in an interior of elbow conduit 36 in order to limit or prevent sliding contact between cord 14 and other surfaces, thereby further reducing the likelihood of abrading the cord during raising and lowering of tabletop 28.

As noted above, varying levels of tension are maintained in cord 14 of electrical power or data system 10 by the elasticity or recoiling force applied in self-retracting cord section 20, throughout the full range of motion of tabletop 28 between its fully raised and fully lowered positions. When tabletop 28 is fully raised, self-retracting cord section 20 may expand to extend along substantially the full length of cord storage and support member 26 with a maximum amount of cord 14 disposed inside of the upright leg 30, such as shown in FIG. 3. The resulting tension imparted to cord 14 by self-retracting cord section 20 causes the cord 14 to be drawn out of the upright leg 30, through elbow conduit 36, and into cord storage and support member 26, as tabletop 28 is lowered, such as shown in FIG. 2 and in the top and middle views of FIG. 1. During this movement of tabletop 28 and cord 14, input end portion 16 remains substantially motionless so as not to inadvertently catch on other objects or create a new trip hazard.

Various alternations and alternatives are envisioned without departing from the spirit and scope of the present invention. These include the different types of self-retracting cord sections and/or retracting devices or mechanisms described above, as well as different electrical power and/or data wiring and terminals or connectors, which may range from high voltage AC power receptacles (e.g., 110-volt and 220-volt), as well as low voltage DC power outlets (e.g., USB-style power-only or power-and-data connectors), and data signal wiring and connectors such as video and/or audio cables, fiber optic lines, and the like. It addition, principles of the present invention may be applied to air lines, gas lines, and other fluid conduits which may be desirable to terminate at an article of height-adjustable furniture, such as in a mechanical workshop, a scientific laboratory or a hospital setting, and thus are not necessarily limited to electrical wiring and electronic data applications.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A height adjustable furniture with electrical power or data system, comprising:
    a movable furniture portion comprising a tabletop or desktop, and a stationary furniture portion comprising lower leg portions of a plurality of upright legs that are coupled to said table top or desktop, wherein said movable portion is raisable and lowerable relative to said stationary portion;
    an electrical power or data cord having an input end portion and an output end portion opposite said input end portion, and a self-retracting cord section disposed between said input end portion and said output end portion;
    an electrical power or data connector disposed at said output end portion of said cord and configured for mounting along said movable portion of said height-adjustable furniture;
    wherein said input end portion is configured to extend outwardly from said stationary portion of said height-adjustable furniture;
    wherein said self-retracting cord section is configured for mounting at either said movable portion or said stationary portion of said height-adjustable furniture, and wherein said self-retracting cord section is configured to extend to a first length upon raising said movable portion of said height-adjustable furniture and to retract to a second length that is shorter than the first length upon lowering said movable portion of said height-adjustable furniture;
    a cord storage and support member coupled to said tabletop or desktop, said cord storage and support member defining a hollow channel for receiving and concealing said self-retracting cord section; and
    wherein at least one of said upright legs defines a hollow interior region, and further comprises an elbow conduit in communication with both said hollow interior region and said hollow channel of said cord storage and support member, wherein an intermediate portion of said electrical power or data cord between said self-retracting cord section and said input end portion is routed through said elbow conduit, and wherein said intermediate portion of said electrical power or data cord is movable through said elbow conduit as said height-adjustable furniture is raised and lowered.

2. The electrical power or data system and height-adjustable furniture of claim 1, wherein said self-retracting cord section comprises an elastic coil portion.

3. The electrical power or data system and height-adjustable furniture of claim 1, wherein said electrical power or data connector comprises a high voltage AC power outlet or a low voltage DC power outlet.

4. The electrical power or data system and height-adjustable furniture of claim 1, wherein said input end portion of said electrical power or data cord comprises at least one chosen from (i) a high voltage AC power plug, (ii) a low voltage DC power plug, and (iii) an electronic data signal plug.

5. The electrical power or data system and height-adjustable furniture of claim 1, wherein said upright legs comprise respective upper leg portions that are telescopingly engaged with respective ones of said lower leg portions.

6. The electrical power or data system and height-adjustable furniture of claim 5, wherein at least one of said upright legs defines a hollow interior region, and wherein a portion of said electrical power or data cord located between said input end portion and said self-retracting cord section is disposed in said hollow interior region.

7. The electrical power or data system and height-adjustable furniture of claim 6, wherein said lower leg portion of said at least one upright leg defines an opening through which said electrical power or data cord passes into said hollow interior region.

8. A height-adjustable furniture article with electrical power or data system, comprising:
  a movable upper furniture portion comprising a tabletop or desktop mounted to a stationary lower furniture portion comprising lower leg portions of a plurality of upright legs that are coupled to said table top or desktop via respective upper leg portions, wherein said movable upper furniture portion is raisable and lowerable relative to said stationary lower furniture portion;
  an electrical power or data cord having an output end portion coupled to said movable upper furniture portion, an input end portion opposite said output end portion, and a self-retracting cord section disposed between said input end portion and said output end portion, wherein said input end portion is configured to extend outwardly from the stationary portion of the height-adjustable furniture;
  wherein at least one of said upright legs defines a hollow interior region for receiving a portion of said electrical power or data cord, and wherein said lower leg portion of said at least one upright leg defines an opening through which said electrical power or data cord passes into said hollow interior region;
  an electrical power or data connector disposed at said output end portion of said cord and accessible at said movable upper furniture portion;
  wherein said self-retracting cord section is configured for mounting at either the movable portion or the stationary portion of the height-adjustable furniture, and wherein said self-retracting cord section is configured to extend to a first length upon raising the movable portion of the height-adjustable furniture and to retract to a second length that is shorter than the first length upon lowering the movable portion of the height-adjustable furniture;
  a cord storage and support member coupled to said tabletop or desktop, said cord storage and support member defining a hollow channel for receiving and concealing said self-retracting cord section; and
  an elbow conduit in communication with both said hollow interior region of said at least one of said upright legs and said hollow channel of said cord storage and support member;
  wherein an intermediate portion of said electrical power or data cord between said self-retracting cord section and said input end portion is routed through said elbow conduit, and wherein said intermediate portion of said electrical power or data cord is movable through said elbow conduit as said height-adjustable furniture is raised and lowered.

9. The height-adjustable furniture article of claim 8, wherein said upper leg portions are telescopingly engaged with respective ones of said lower leg portions.

10. The height-adjustable furniture article of claim 8, wherein said self-retracting cord section comprises an elastic coil portion.

11. The height-adjustable furniture article of claim 8, wherein said electrical power or data connector comprises a high voltage AC power outlet or a low voltage DC power outlet.

12. The height-adjustable furniture article of claim 8, wherein said input end portion of said electrical power or data cord comprises at least one chosen from (i) a high voltage AC power plug, (ii) a low voltage DC power plug, and (iii) an electronic data signal plug.

* * * * *